Sept. 17, 1963    A. B. SKROMME    3,104,111
MATERIAL UNLOADER WITH ROTARY BEATER ATTACHMENT
Filed April 19, 1961    2 Sheets-Sheet 1
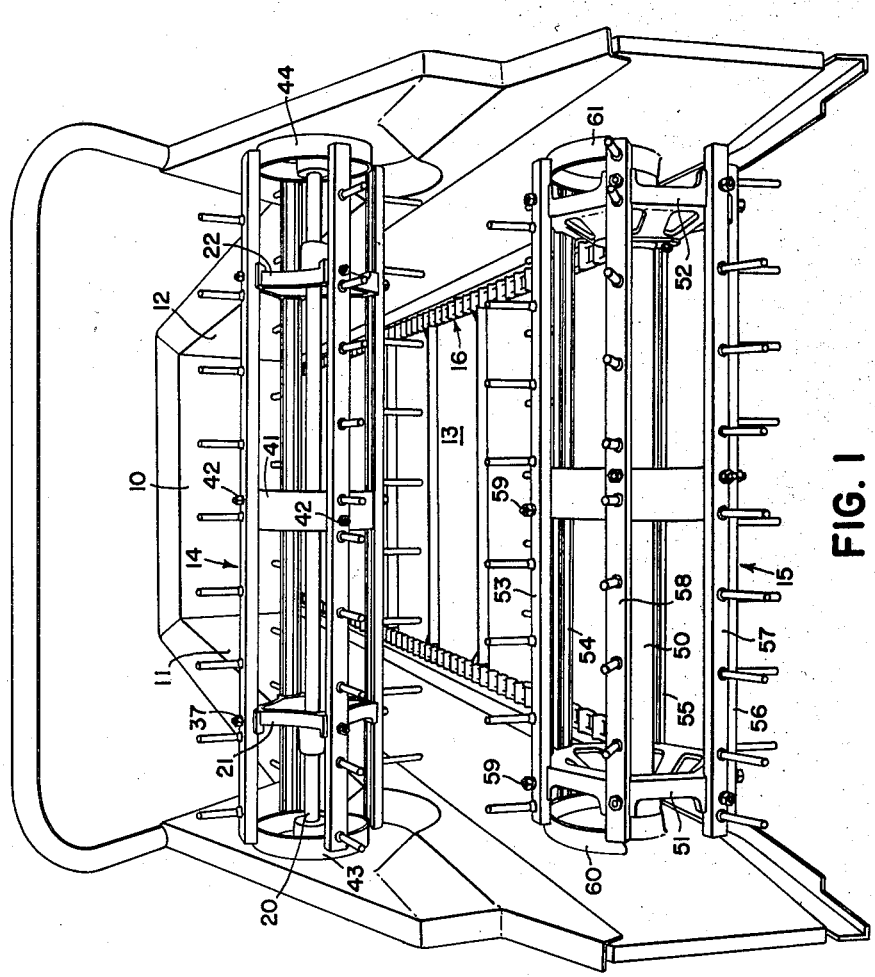
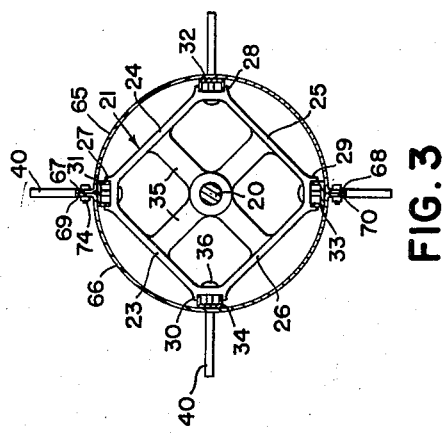
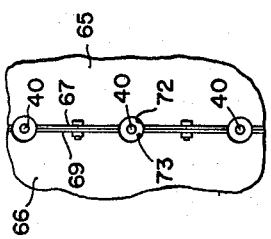
INVENTOR.
ARNOLD B. SKROMME
BY *William A. Murray*
ATTORNEY

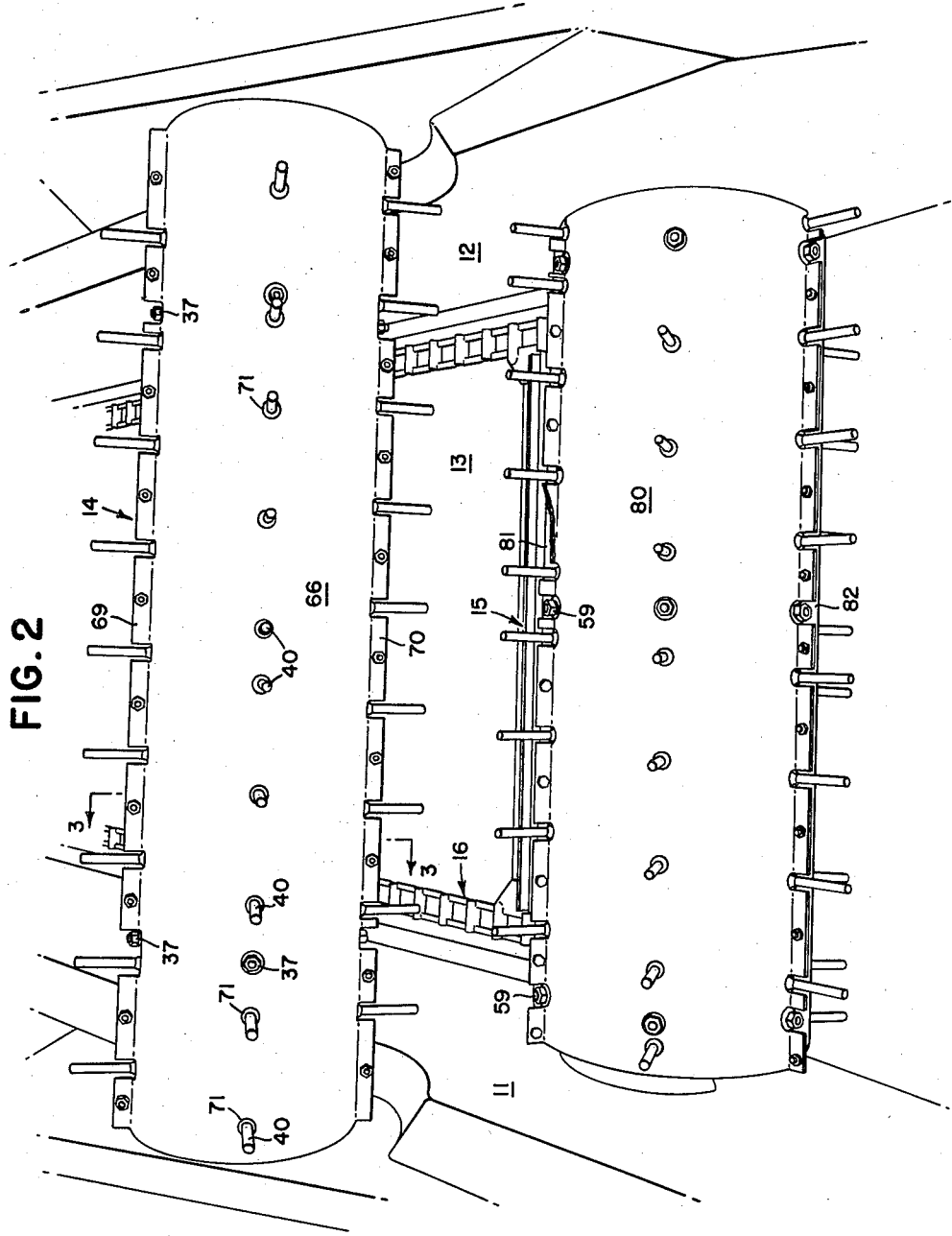

United States Patent Office 3,104,111
Patented Sept. 17, 1963

3,104,111
MATERIAL UNLOADER WITH ROTARY
BEATER ATTACHMENT
Arnold B. Skromme, Moline, Ill., assignor to Deere &
Company, Moline, Ill., a corporation of Delaware
Filed Apr. 19, 1961, Ser. No. 104,166
7 Claims. (Cl. 275—3)

This invention relates to a material unloader and more particularly to an attachment for a material unloader utilizing a beater mechanism at one end of the unloader which tends to break up the material prior to its discharge from the unloader.

In the conventional type of material unloader and particularly in the type of material unloader of the manure spreader type, there is provided a series of beaters at one end of the main container of the unloader. The beaters are disposed transversely relative to the direction of movement of the material and are generally composed of open beater sections which include a series of transverse bars carried in angularly spaced relation about a central drive shaft. Mounted on the bars and extending radially outwardly therefrom are rigid fingers which serve the purpose of gripping and tearing the material apart. The transverse beaters are generally of an open construction to provide a more aggressive action against the material as it is fed to the beaters. Such a construction is normally satisfactory in operation.

There are some instances that it is desired to provide a cover over the beater bars to generally close the beater devices except for the radially extending fingers. Such desire may occur in cold climates and in cold weather where, for example, should manure come in contact with the beaters it would tend to freeze on the beater mechanism and tend to build up as additional loads are fed into the beater mechanism. Also, in various types of material and often in the case of manure, there will exist straw and hay which may tend to wrap about the open-type beater, eventually to cause a large buildup on the beater which must be removed for proper operation.

It is therefore the main object of the present invention to provide an attachment cover for the beater mechanism which will fit over the beater device and completely enclose the device except for the fingers which extend radially beyond the cover. Specifically it is proposed to provide a beater cover which is formed of a plurality of partial-cylindrical sections, each having an arcuate length between opposite transverse edges substantially equal to two spaces between the bars on the beater and two widths of the bars. The central area between the transverse edges of the beater cover will have a series of openings to accommodate rigid finger portions on one of the finger bars. Opposite edges of the cover will be provided with notches therein which will accommodate partially the fingers on the adjacent finger bars.

A further object of the invention is to provide radial flanges on the transverse edges of the beater cover portions to provide additional aggressive beater means on the transverse edges of the beater cover portions to provide additional aggressive beater means on the beater and to serve as means for attachment to the adjacent beater cover sections. By extending bolt and nut combinations through the adjacent flanges, the beater cover may be rigidly mounted on the respective beaters.

Other objects and advantages of the invention will become apparent to those skilled in the art as the nature of the invention is better understood from the following description and as shown in the accompanying drawings.

FIG. 1 is a rear perspective view of the manure spreader shown with beaters not having the covering device of the present invention.

FIG. 2 is an enlarged perpsective view of the beater portion of the spreader showing the detachable cover sections thereon.

FIG. 3 is a sectional view taken substantially along line 3—3 of FIG. 2.

FIG. 4 is a fragmentary plan view of one of the beater devices.

Referring first to FIG. 1, there is provided a conventional type spreader box having a front wall 10, a pair of transversely spaced side walls 11, 12 and a floor 13 connecting the lower edges of the side walls 11, 12 and the front wall 10. The spreader box is normally open to its rear and there is provided upper and lower beaters 14, 15. There is also provided on the floor 13 of the box a floor conveyor, here indicated in its entirety by the reference numeral 16, feeding material rearwardly and toward the beaters 14, 15.

The upper beater 14 is composed of a centrally located transverse drive shaft 20. Supported on the drive shaft 20 and spaced from the respective walls 11, 12 are a pair of radially extending supports 21, 22. Referring to FIG. 3, the support 21 is composed of a square section structural member having sides 23, 24, 25 and 26 with corner flanges 27, 28, 29 and 30 joining the respective sides 23–26. The flanges 27–30 are generally composed of transverse and spaced apart ribs which open radially outwardly to receive transversely extending finger bars 31, 32, 33 and 34, the latter being U-shaped in cross section with the legs of each of the U-shaped bars 31–34 being inserted between the flange portions on the corners 27–30. The radial structural member further includes spokes, such as at 35, extending from the shaft 20 to the central portion of the sides 23–26.

Fixed by welding on the transverse bars 31–34 are rows of axially spaced apart and radially projecting rigid fingers 40. Bolts, such as at 36, extend through the corner portions 27–30 and through the bars 31–34 for the purpose of attaching the bars to the radial structure 21. Nuts, such as at 37, are provided adjacent the outer surface of the bars 31–34 and may be tightened to rigidify the entire finger portion of the beater to the respective radial support 21. A similar arrangement is provided for the radial support 22 and consequently no further description will be given relative to that support. A centrally located annular member 41 is provided internally of the bars 31–34 and is attached thereto by means of bolt and nut combinations 42. Fixed to the respective side walls 11, 12 are anti-wrap shields 43, 44 concentric with the shaft 20 and positioned just internally of the bars 31–34 to serve as unattached supports or guides for the respective bars.

The lower beater 15 is of a similar construction as the upper beater 14 but generally is of a larger size than the upper beater 14. The beater 15 is composed of a main drive shaft 50 and a pair of radial structural members 51, 52 at opposite ends thereof and disposed spacedly inwardly from the respective sidewalls 11, 12. The structural members 51, 52, rather than being of the four-sided figure as shown in FIG. 3 is of a hexagon type structure having six sides as well as six corners formed with flanges or corner portions, similar to the corner sections or portions 27–30 on the upper beater 14. There are provided six equally angularly spaced finger bars 53, 54, 55, 56, 57 and 58 mounted on the corner portions of the hexagonal radial structures 51, 52. The bars 53–58 are similar to the previously described finger bars 31–34 and are mounted on the respective hexagonal supports 51–52 by means of bolt and nut combinations, as indicated at 59. An annular member fits just inwardly of the finger bars 53–58 and centrally between the side walls 11 and 12. Shields 60, 61 are fixed to the side walls 11 and 12 and extend inwardly therefrom to a point beneath respective opposite ends of the finger bars 53–58. It will be noted from viewing FIG. 2 that the shields 60, 61 are only partially annular, the lower portions being removed for purposes of permitting material to pass off of the floor 13.

Referring now to FIGS. 2 and 3, there is provided on the upper beater 14 a detachable cover composed of a pair of partial- or semi-cylindrical casing sections 65, 66. The partial- or semi-cylindrical sections 65, 66 are composed of diametrically opposite and radially extending edges or flanges 67, 68 and 69, 70 respectively. Centrally located between the transverse edges 69, 70 is a transversely extending row of openings 71 positioned to accommodate the fingers 40 on the upper finger bar 34. As may be seen from viewing FIG. 4, the flanges or edges 67, 69 lie adjacent to one another and may be bolted as at 74. The notches 72, 73 open to the edges and provide an opening for the fingers 40. A similar arrangement is provided in the flanges or edges 68, 70 on the opposite side of the beater drum. Likewise a similar row of openings is provided in the partial- or semi-cylindrical casing 65.

Referring to the cover for the lower beater 15, the means of mounting the beater covers on the beater bars are identical to that of the upper beater 14. With the main exception between the two structures being due to the fact that there are six beater or finger bars 53–58. There will be three partial-cylindrical covering panels or sections, shown at 80 and partially shown at 81, 82 in FIG. 2. Since it is proposed that the present casing structures 65, 66 and 80, 81, 82 are to be added as attachments, there must be provision for mounting the casings away from the place of manufacture. By providing the casings to extend an angular distance equal to the spacing between two of the finger bars and the width of two finger bars and by providing a row of finger openings centrally between the transverse edges of the casings, the respective partial-cylindrical casing may be slipped over one of the rows of fingers and the notches in the edges of the respective casing sections will accommodate the fingers on the next adjacent rows of fingers on the opposite sides of the central row of fingers. In this manner the partial-cylindrical casing may be applied from the outside of the respective beaters 14, 15. Referring again to FIG. 3, it will be noted that the respective partial-cylindrical casings 65, 66 lie adjacent to the outer surfaces of the respective finger bars 31, 32. Openings are provided in the casing 65, 66 to accommodate the bolt and nut combinations 36, 37 which mount the finger bars 31–34 to the radial supporting members 21, 22. The cover sections 80–82 on the lower beater 15 are also mounted adjacent the outer surfaces of the respective finger bars 53–58 and are attached thereto by a bolt and nut combination 59.

While only one form of the invention has been shown, it should be recognized that other forms and variations will occur to those skilled in the art. Therefore, while the present disclosure has been shown and described in detail for the purpose of clearly and concisely illustrating the principles of the invention, it is not the intention to limit or narrow the invention beyond the broad concept set forth in the appended claims.

What is claimed is:

1. An attachment for a rotary beater in a material unloader, the rotary beater having a central shaft, a series of axial bars spaced angularly about the shaft and spaced radially therefrom, a series of axially spaced and radially outwardly projecting rows of fingers on the bars, and radial structure extending from the shaft to the bars for supporting the latter on the former, said attachment comprising: a series of elongated partial-cylindrically shaped casing members capable of defining when in an adjoining relation with one another a complete cylindrical casing, each of said members having an angular length between opposite axial edges thereof encompassing two bars and two spacings between the bars, each casing member further having a row of finger openings centrally located between the axial edges for accommodating a row of fingers on one of the bars and two rows of notches on the opposite axial edges for accommodating fingers on the bars; radial flanges extending outwardly from the respective axial edges; and detachable means for connecting flanges of adjoining sections together.

2. The invention defined in claim 1 in which the partially-cylindrical shaped casing members are formed about an axis at a radial distance substantially equal to the distance between the axis of the shaft and the outer surface of the bars.

3. The invention defined in claim 2 in which the radial flanges of the cylindrical casing members abut one another on the outer surfaces of the bars and extend radially from the respective surfaces whereby the bars serve as support for the edges of the casing members.

4. The invention defined in claim 1 whereby the notches in the edges of the cylindrical casings are U-shaped and open to the edges and whereby the notches in adjoining casings are aligned to provide openings for the fingers on the bars.

5. An attachment for a rotary beater in a material unloader, the rotary beater having a central shaft, a series of axial finger bars spaced angularly about the shaft and spaced radially therefrom, a series of axially spaced and radially outwardly projecting rows of fingers on the bars, and radial structure extending from the shaft to the finger bars for supporting the latter on the former, said attachment comprising: a series of elongated partial-cylindrically shaped casing members capable of defining when in an adjoining relation with one another a complete cylindrical casing, each of said members having an angular length between opposite axial edges thereof encompassing two bars and two spacings between the bars, each member further having a row of finger openings centrally located between the axial edges for accommodating a row of fingers on one of the finger bars and two rows of notches on the opposite axial edges for accommodating fingers on the finger bars to permit the central portion of the casing member to lie adjacent one finger bar and the opposite edges to lie adjacent the finger bars on opposite sides of said one finger bar; and detachable means for connecting edges of adjoining sections together.

6. An attachment for a rotary beater in a material unloader, the rotary beater having a central shaft, a series of axial finger bars spaced angularly about the shaft and spaced radially therefrom, a series of axially spaced and radially outwardly projecting rows of fingers on the bars, and radial structure extending from the shaft to the finger bars, for supporting the latter on the former, said attachment comprising: a series of elongated partialy-cylindrically shaped casing members capable of defining when in an adjoining relation with one another a complete cylindrical casing, said casing members having row of notches on their axial edges and central rows of openings for accommodating fingers on the finger bars; and detachable means for connecting edges of adjoining sections together.

7. An attachment for a rotary beater in a material unloader, the rotary beater having a central shaft, a series of axial bars spaced angularly about the shaft and spaced radially therefrom, axially spaced and radially outwardly projecting rows of fingers on the bars, and radial structure extending from the shaft to the bars for supporting the latter on the former, said attachment comprising: a series of elongated partial-cylindrically shaped casing members capable of defining when in an adjoining relation with one another a complete cylindrical casing, said casing members having centrally located between their edges rows of finger openings and edge notches for accommodating rows of fingers; radial flanges extending outwardly from the opposite axial edges of the casing members;

and detachable means for connecting flanges of adjoining sections together.

References Cited in the file of this patent

UNITED STATES PATENTS

| | | | |
|---|---|---|---|
| 704,747 | Johnson et al. | July 15, | 1902 |
| 1,125,409 | Skason | Jan. 19, | 1915 |
| 1,282,854 | Kemp | Oct. 29, | 1918 |
| 1,636,829 | Neighbour | July 26, | 1927 |
| 1,834,022 | Furman | Dec. 1, | 1931 |
| 1,905,384 | Jass | Apr. 25, | 1933 |
| 2,699,947 | Neighbour et al. | Jan. 18, | 1955 |

FOREIGN PATENTS

| | | | |
|---|---|---|---|
| 440,521 | Germany | Aug. 21, | 1925 |
| 886,397 | Germany | Aug. 13, | 1953 |
| 192,076 | Switzerland | Oct. 1, | 1937 |